US008679618B2

(12) United States Patent
Moon et al.

(10) Patent No.: US 8,679,618 B2
(45) Date of Patent: Mar. 25, 2014

(54) OPTICAL FILM, METHOD OF MANUFACTURING OPTICAL FILM AND LIQUID CRYSTAL DISPLAY DEVICE HAVING THE SAME

(75) Inventors: Jeong Min Moon, Gyeonggi-do (KR); Byung Hwa Ji, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 591 days.

(21) Appl. No.: 11/797,325

(22) Filed: May 2, 2007

(65) Prior Publication Data

US 2008/0113113 A1    May 15, 2008

(30) Foreign Application Priority Data

Nov. 10, 2006 (KR) .................. 10-2006-0110786

(51) Int. Cl.
```
B32B 27/08    (2006.01)
B32B 27/36    (2006.01)
B32B 27/30    (2006.01)
B32B 27/14    (2006.01)
B32B 7/02     (2006.01)
B29C 47/06    (2006.01)
B29C 55/14    (2006.01)
G02F 1/1333   (2006.01)
```
(52) U.S. Cl.
USPC ........... 428/213; 428/216; 428/323; 428/328; 428/330; 428/331; 264/1.7; 264/167; 264/294; 349/56; 359/580

(58) Field of Classification Search
USPC .......... 428/1.1, 213, 216, 480, 483, 323, 328, 428/331, 330; 385/129–131, 141–145; 359/580; 349/56; 264/1.7, 167, 294
See application file for complete search history.

(56) References Cited

U.S. PATENT DOCUMENTS

| | | | |
|---|---|---|---|
| 5,360,659 A * | 11/1994 | Arends et al. ................. | 428/216 |
| 5,783,129 A | 7/1998 | Shirai et al. | |
| 5,828,488 A | 10/1998 | Ouderkirk et al. | |
| 5,882,774 A | 3/1999 | Jonza et al. | |
| 5,962,114 A | 10/1999 | Jonza et al. | |
| 6,268,961 B1 * | 7/2001 | Nevitt et al. ............. | 359/485.03 |

(Continued)

FOREIGN PATENT DOCUMENTS

| | | |
|---|---|---|
| JP | 8-313931 A | 11/1996 |
| JP | 2000-275669 A | 10/2000 |
| JP | 2003-31555 A | 11/2003 |
| WO | WO 2005095097 A1 * | 10/2005 ................ B32B 7/02 |

OTHER PUBLICATIONS

Machine Translation of JP 2001-064600 (Mar. 2001).*

(Continued)

*Primary Examiner* — Prashant J Khatri
(74) *Attorney, Agent, or Firm* — Morgan, Lewis & Bockius LLP

(57) ABSTRACT

An optical film includes a multi-layer sheet including: a plurality of polyethylene terephthalate polymer layers, the polymer layers having a first refraction index in a first direction parallel to a plane of the polymer layers and a second refraction index in a second direction parallel to the plane of the polymer layers, and a plurality of polyethylene terephthalate copolymer layers, the copolymer layers having a third refraction index in the first and second directions, a protection sheet on at least one side of the multi-layer sheet, and an adhesive member between the multi-layer sheet and the protection sheet.

20 Claims, 12 Drawing Sheets

(56) References Cited

U.S. PATENT DOCUMENTS

| | | |
|---|---|---|
| 6,449,093 B2 * | 9/2002 | Hebrink et al. ............... 359/497 |
| 6,498,683 B2 | 12/2002 | Condo et al. |
| 6,654,170 B1 | 11/2003 | Merrill et al. |
| 2001/0019182 A1 * | 9/2001 | Hebrink et al. ............... 264/1.6 |
| 2005/0024726 A1 * | 2/2005 | Ouderkirk et al. ............ 359/494 |
| 2007/0224434 A1 * | 9/2007 | Osada et al. .................. 428/480 |

OTHER PUBLICATIONS

Office Action issued Sep. 28, 2009 in corresponding Japanese Application No. 2006-302271.

KIPO—Korean Office Action for Patent Application No. 10-2006-0110786—Issued on Feb. 18, 2013.

* cited by examiner

OPTICAL FILM, METHOD OF MANUFACTURING OPTICAL FILM AND LIQUID CRYSTAL DISPLAY DEVICE HAVING THE SAME

The present application claims the benefits of Korean Patent Application No. 10-2006-0110786 filed in Korea on Nov. 10, 2006, which is hereby incorporated by reference in its entirety.

BACKGROUND OF THE INVENTION

1. Field of the Invention

Embodiments of the present invention relate to an optical film, and more particularly to a liquid crystal display (LCD) device having the optical film.

2. Description of the Related Art

Generally, a liquid crystal display device includes a thin film transistor substrate, a color filter substrate, a liquid crystal display panel having a liquid crystal layer interposed between the thin film transistor substrate and the color filter substrate, and backlight unit having a separate light source for supplying light to the liquid crystal display panel. The liquid crystal display device includes a polarizer formed on at least one of the top and bottom surfaces of the liquid crystal display panel. The backlight unit includes the light source emitting light and optical films directing the light emitted from the light source toward the top surface of the liquid crystal display panel. The optical films include at least one of a diffusion film, a prism film, and a protection film. Although light emitted from the light source is directed to the polarizer through the optical films, only some of the light having a polarization direction parallel to a transmission axis of the polarizer is transmitted through the polarizer.

Light polarized by the polarizer is incident onto the liquid crystal display panel and is modulated according to the molecular arrangement of the liquid crystal layer of the liquid crystal display panel. Thus, an image can be displayed on a screen of the liquid crystal display device. Other components of the light that are blocked by the polarizer are reflected from the polarizer or absorbed by the polarizer. Therefore, a large portion of light emitted from the light source dose not reach the liquid crystal display panel. As a result, the overall brightness of the backlight is not used, and more power is required for the backlight unit to provide sufficient brightness to the liquid crystal display device.

SUMMARY OF THE INVENTION

Accordingly, embodiments of the invention are directed to an optical film, a method of manufacturing the optical film, and a liquid crystal display device including the same that substantially obviate one or more problems due to limitations and disadvantages of the related art.

An object of embodiments of the invention is to improve the optical efficiency of a liquid crystal display device, to increase the brightness of the liquid crystal display device, and to reduce the power consumption of a backlight assembly.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, an optical film includes a multi-layer sheet including: a plurality of polyethylene terephthalate polymer layers, the polymer layers having a first refraction index in a first direction parallel to a plane of the polymer layers and a second refraction index in a second direction parallel to the plane of the polymer layers, and a plurality of polyethylene terephthalate copolymer layers, the copolymer layers having a third refraction index in the first and second directions, a protection sheet on at least one side of the multi-layer sheet, and an adhesive member between the multi-layer sheet and the protection sheet.

In another aspect, an optical film includes a multi-layer sheet including: polymer layers having a first refraction index in a first direction parallel to a plane of the polymer layer and a second refraction index in a second direction parallel to the plane of the polymer layer, and copolymer layers having a third refraction index in the first and second directions, wherein the polymer layers and the copolymer layers are stacked for transmitting a first component of light incident onto the multi-layer sheet and reflecting a second component of the incident light; a protection sheet on at least one side of the multi-layer sheet; and an adhesive member between the multi-layer sheet and the protection sheet.

In another aspect, an optical film includes a multi-layer sheet including: a plurality of polymer layers, the polymer layers including polyethylene terephthalate and having a first refraction index in a first stretching direction parallel to a plane of the polymer layers and a second refraction index in a second stretching direction parallel to the plane of the polymer layers, and a plurality of copolymer layers, the copolymer layers including polyethylene terephthalate copolymer and having a third refraction index in the first and second stretching directions, a protection sheet on at least one side of the multi-layer sheet, and an adhesive member between the multi-layer sheet and the protection sheet.

In another aspect, a liquid crystal display device includes a liquid crystal display panel for displaying images, a reflector for reflecting light, a backlight assembly between the reflector and the liquid crystal panel for irradiating light onto the liquid crystal display panel, and an optical film between the backlight assembly and the liquid crystal panel, the optical film having: a multi-layer sheet including: a plurality of polymer layers, the polymer layers including polyethylene terephthalate and having a first refraction index in a first stretching direction parallel to a plane of the polymer layers and a second refraction index in a second stretching direction parallel to the plane of the polymer layers, and a plurality of copolymer layers, the copolymer layers including polyethylene terephthalate copolymer and having a third refraction index in the first and second stretching directions, a protection sheet on at least one side of the multi-layer sheet, and an adhesive member between the multi-layer sheet and the protection sheet.

In another aspect, a method of fabricating an optical sheet includes preparing a polymer including polyethylene terephthalate, preparing a copolymer including polyethylene terephthalate and an additive material, melting and extrusion-processing each of the polymer and copolymer in layered shape, alternately stacking the extrusion-processed polymer and copolymer, multiplying the number of layers of the polymer and copolymer in a multiplier, stretching the stacked polymer and copolymer in a first stretch direction, stretching the first stretched polymer and copolymer in a second stretch direction, the polymer layers having first and second refraction indexes in the first and second stretching directions, respectively, and the copolymer layer having a third refraction index in the first and second stretching directions, and attaching a protection sheet on at least one side of the stacked polymer and copolymer.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF EXEMPLARY EMBODIMENTS

Reference will now be made in detail to exemplary embodiments of the present invention, examples of which are illustrated in the accompanying drawings. Wherever possible, the same reference numbers will be used throughout the drawings to refer to the same or like parts.

Figure 1:
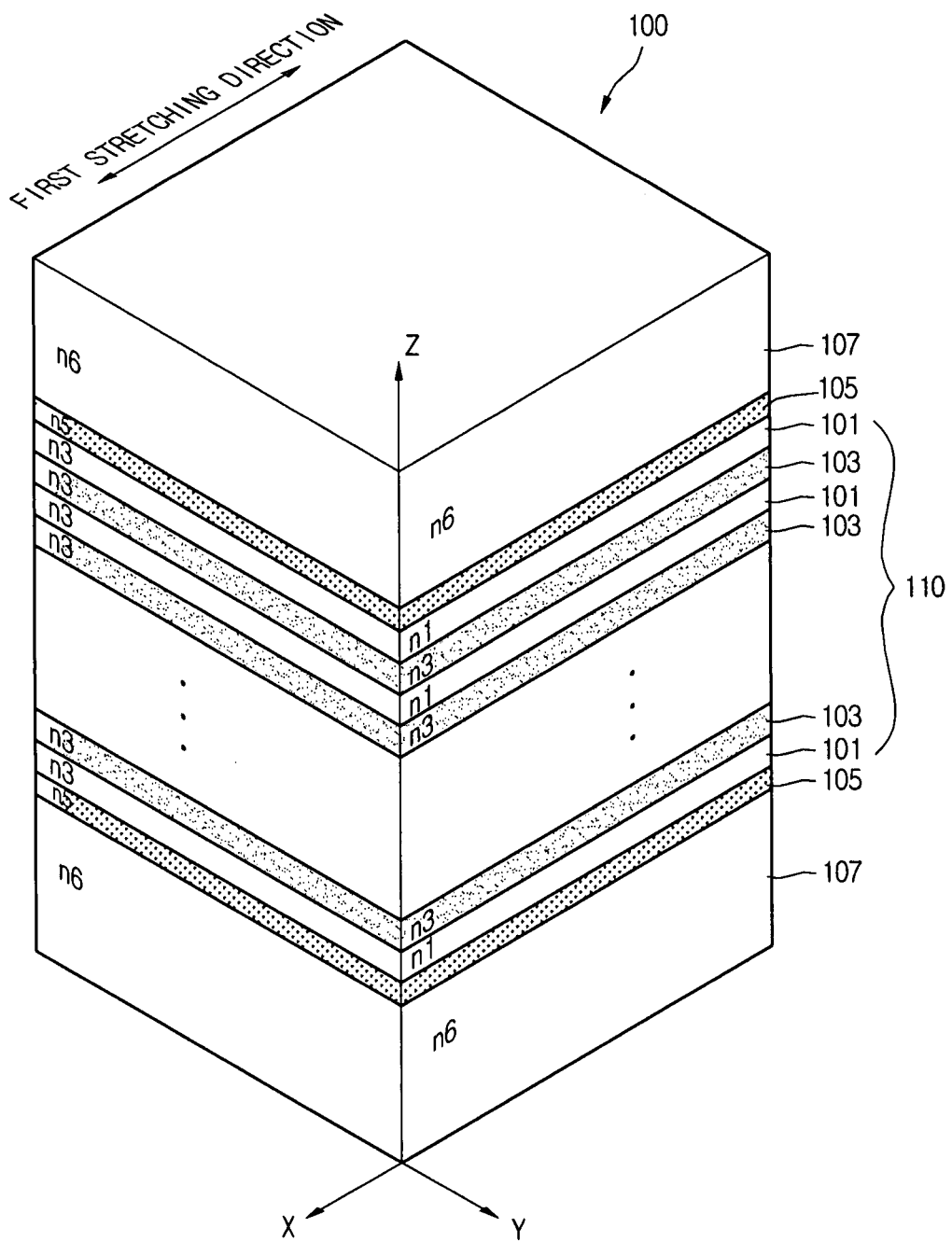
FIG. 1 shows a perspective view of an optical film according to a first embodiment of the invention.
Figure 2A:
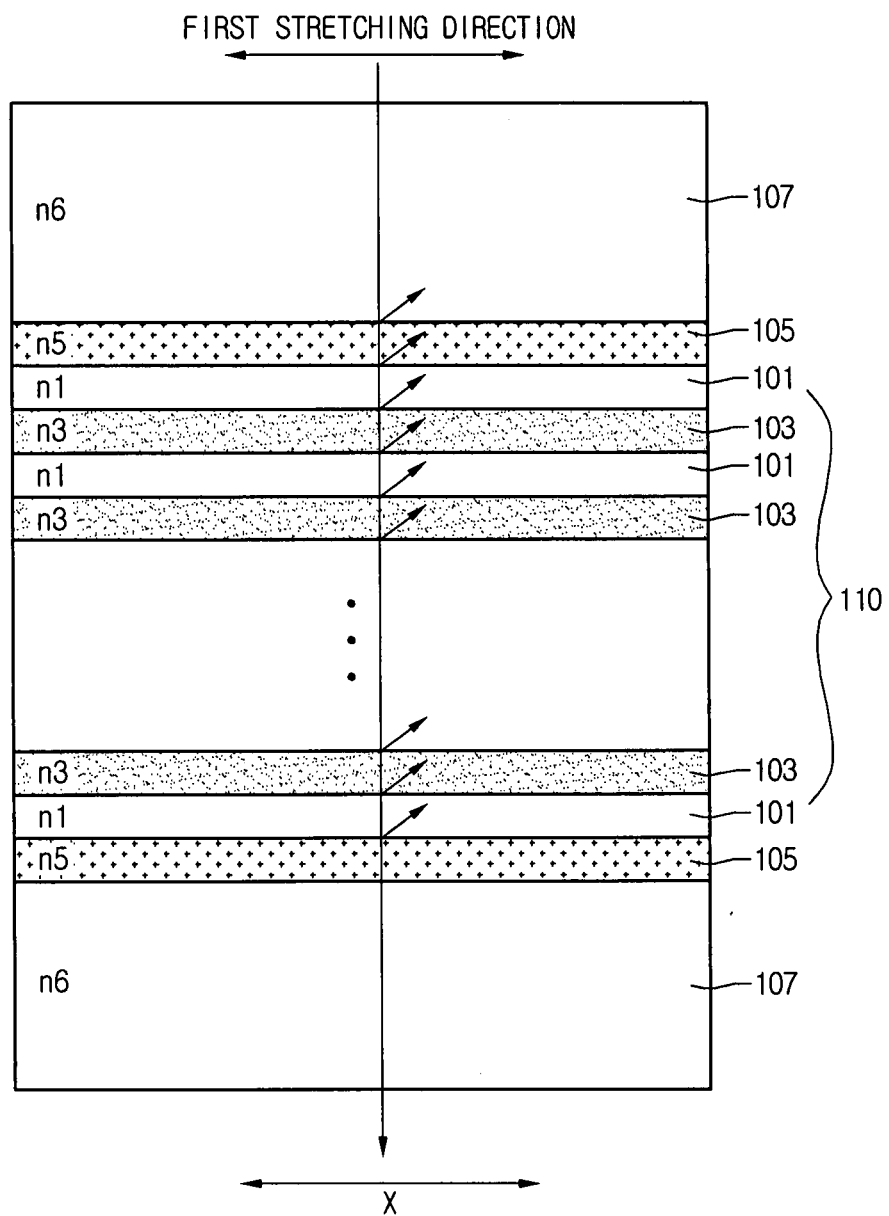
FIG. 2A shows a side view of the optical film of FIG. 1 in a stretching direction.
Figure 2B:
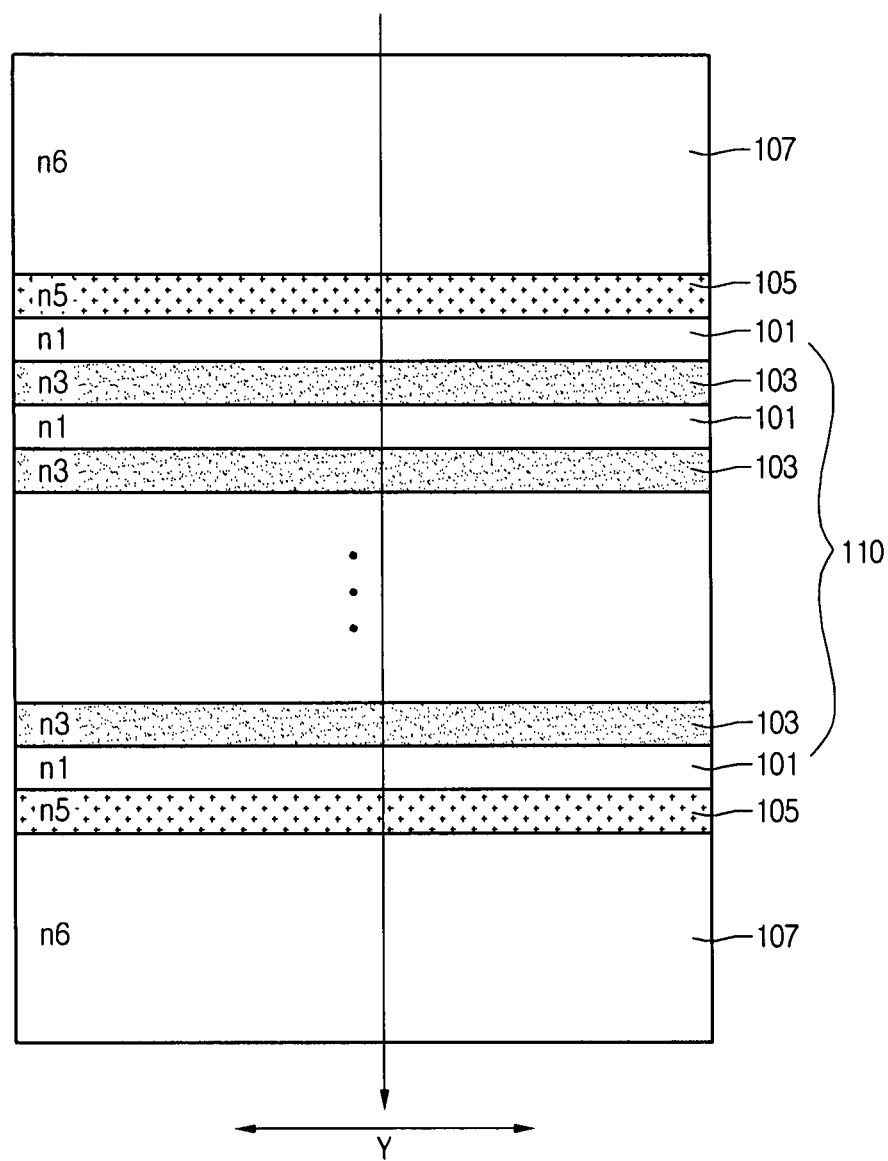
FIG. 2B shows a side view of the optical film of FIG. 1 in a non-stretching direction.

FIG. 1 shows a perspective view of an optical film according to a first embodiment of the invention, FIG. 2A shows a side view of the optical film of FIG. 1 in a stretching direction, and FIG. 2B shows a side view of the optical film of FIG. 1 in a non-stretching direction. Referring to FIG. 1, the optical film 100 includes a multi-layered sheet 110. The multi-layered sheet 110 includes a plurality of polymer layers 101 having a first refractive index n1 in a stretching direction on a plane, and having a third refractive index n3 in a non-stretching direction, and a plurality of copolymer layers 103 alternating with the polymer layers 101, and having the third refractive index n3 in the stretching direction and the non-stretching direction. In an embodiment, the non-stretching direction is perpendicular to the stretching direction on the plane of the optical film 100.

The optical film 100 further includes a protection sheet 107 formed on at least one side of the multi-layered sheet 110. In addition, the optical film 100 includes an adhesive member 105 interposed between the multi-layered sheet 110 and the protection sheet 107.

The polymer layer 101 of the multi-layered sheet 110 is drawn in the stretching direction, and has the first refractive index n1 in the stretching direction. Further, the polymer layer 101 has the third refractive index n3 in the non-stretching direction. Herein, the first refractive index n1 is greater than the third refractive index n3.

Assuming that one axis on the plane of the multi-layered sheet 110 is an X-axis, a perpendicular axis on the plane including the X-axis is an Y-axis, an axis perpendicular to the plane is a Z-axis, the stretching direction is parallel to the X-axis, and the non-stretching direction is parallel to the Y-axis.

The optical film 100 transmits one component of incident light and reflects the other component of the light through a difference in the refractive index of the optical film 100. The thickness of the optical film 100 can be controlled to obtain maximum performance of the optical film 100. Also, it is possible to control the thicknesses of the polymer 101 and the copolymer 103 constituting the optical film 100, respectively.

In the optical film 100 in which the plurality of polymer layers 101 and the plurality of copolymer layers 103 are alternately arranged, each of the polymer layers 101 and the copolymer layers 103 may have different thicknesses. For example, the thicknesses of the polymer layers 101 may gradually increase from the outer side to the center of the optical film 100. Likewise, the thicknesses of the copolymer layers 103 may gradually increase from the outer side to the center of the optical film 100. On the other hand, the thicknesses of the polymer layers 101 can gradually decrease from the outer side to the center of the optical film 100. Also, the thicknesses of the copolymer layers 103 can gradually decrease from the outer side to the center of the optical film 100.

Since the first refractive index n1 formed in the X-axis, the third refractive index n3 formed along the Y-axis, and a refractive index (not determined) formed along the Z-axis are different in the polymer layer 101, the polymer layer 101 may have a birefringence property. The copolymer layer 103 has the third refractive index n3 along the X and Y-axes.

A refractive index formed along the X-axis and a refractive index formed along the Y-axis may be equal to each other in the protection sheet 107. The protection sheet 107 may include the copolymer layer 103 or the polymer layer 101. The protection sheet 107 has a sixth refractive index n6. There is almost no difference in a refractive index of the polymer layer 101 and the copolymer layer 103 in the non-stretching direction.

The adhesive member 105 has a fifth refractive index n5 which is smaller than the sixth refractive index n6 of the protection sheet 107. Therefore, the multi-layered sheet 110 in which the copolymer layers 103 and the polymer layers 101 are alternately arranged reflects most of a first light component of incident light, and transmits most of a second light component.

The optical film 100 formed by alternately stacking the polymer layers 101 and the copolymer layers 103 is characterized in that a first component of light incident onto the multi-layer sheet 110 is reflected while a second component of the incident light is transmitted through the multi-layer sheet 110. In other words, pairs of the polymer layer 101 and the copolymer layer 103 are stacked such that alternately arranged polymer layers 101 and the copolymer layers 103 reflect a first component of light incident onto the multi-layer sheet 110 while a second component of the incident light is transmitted through the multi-layer sheet 110.

For example, a light source generates light having a p-wave component and an s-wave component, and the optical film sheet 100 transmits the p-wave component of light to a liquid crystal display panel and reflects the s-wave component of the light. The s-wave component reflected from the optical film 100 is then incident onto a reflector disposed at the back of the optical film 100. The reflector subsequently changes the phrase of a portion of the reflected s-wave component of light into p-wave component. As a result, the reflected light then includes a first remaining portion of s-wave component and a converted portion of p-wave component, and the reflector reflects such light back to the optical film 100. Thus, the optical film 100 transmits the converted portion of p-wave component onto the liquid crystal display panel. Moreover, as the optical film 100 transmits the converted portion of p-wave component, the optical film 100 also reflects the first remaining portion of s-wave component back to the reflector. In particular, the first remaining portion of s-wave component is smaller than the previous reflected portion of light. Further, the first remaining portion of s-component component of light is again incident on the reflector and a portion of such light is converted into p-wave component to be transmitted through the optical film 100. Therefore, a portion of the reflected s-wave component of light is recycled and transmitted through the optical film 100 as a p-wave component of light, thereby improving optical efficiency.

The s-wave component and p-wave component of light can be perpendicular to each other and vibrate with respect to a traveling direction of light. For example, light can be incident onto the optical film 100 in the Z-axis direction, and the s-wave component and p-wave component can vibrate in X-axis and Y-axis directions. Preferably, the vibration direction of the s-wave component is parallel with the first stretching direction of the multi-layer sheet 110, and the vibration direction of the p-wave component is parallel with the second stretching direction of the multi-layer sheet 110.

According to an embodiment of the invention, a first light component of light incident onto the multi-layered sheet 110 is reflected, and a second light component passes through the multi-layered sheet 110. The vibration direction of the first light component may be identical to the first stretching direction, and the vibration direction of the second light component may be identical to the non-stretching direction. The reflected first light component is reflected by a reflector disposed on the rear side of the optical film 100, and the reflected light is re-incident to the optical film 100.

According to an embodiment of the invention, the light reflected by the reflector has a first light component and a second light component. The second light component of the reflected light is re-incident to the optical film, and passes through the multi-layered sheet 110. The first light component of the reflected light is reflected at the multi-layered sheet 110 again. The reflected first light component is again reflected at the reflector. At this time, a portion of the first light component is converted into the second light component, which is re-incident to the optical film 100. In the re-incident light, the second light component passes through the multi-layered sheet 110, and the first light component is reflected again.

Since there is a large difference in the refractive indexes of the polymer layer 101 and the copolymer layer 103 constituting the multi-layered sheet 110 in the stretching direction, an incident first light component is reflected by a boundary between the polymer layer 101 and the copolymer layer 103.

On the other hand, since there is almost no difference between the refractive indexes of the polymer layer 101 and the copolymer layer 103 constituting the multi-layered sheet 110 in the non-stretching direction, an incident second light component can directly pass through the polymer layer 101 and the copolymer layer 103.

The reflected first light component is reflected again at the reflector disposed on the rear side of the optical film, and the reflected light is re-incident to the optical film 100. The second light component of the re-incident light passes through the multi-layered sheet 110, and the first light component is reflected again. As described above, the optical film 100 selectively reflects and transmits the light incident thereon. The reflected light is re-incident onto the optical film 100, and only the second light component is transmitted, which increases light brightness on the whole.

The protection sheet 107 includes a copolymer layer or a polymer layer. A material constituting the protection sheet 107 may include a polyester-based material. The polyester-based material may include at least one of polyethylene terephthalate (PET), polytrimethylene terephthalate (PTT), polyethylene naphthalate (PEN), PET copolymer, PTT copolymer, and PEN copolymer.

The protection sheet 107 includes at least one of the polymer layer 101 and the copolymer layer 103. For example, in the case where the protection sheet 107 is formed of the copolymer constituting the multi-layered sheet 110, affinity between the protection sheet 107 and the multi-layered sheet 110 increases. Therefore, it is possible to prevent wrinkle generation on the film and exfoliation of the protection sheet 107 from the multi-layered sheet 110.

The fifth refractive index $n_5$ of the adhesive member 105 may be substantially equal to the sixth refractive index $n_6$ of the protection sheet 107. Alternatively, the refractive index of the adhesive member 105 may be smaller than that of the protection sheet 107. The protection sheet 107 may have a thickness ranging from about 50 μm to about 200 μm, which may be equal to the thickness of the multi-layered sheet 110.

A refraction characteristic of the polymer layer 101 of the optical film 100 changes in one axis direction due to drawing. The term 'drawing' denotes a series of processes of applying physical force to the polymer layer 101 having a film shape through extrusion-molding, and drawing the polymer layer 101 in one direction. The refractive index of the polymer layer 101 changes depending on a direction in which the drawing process is performed, so that the polymer layer 101 has birefringence. The refractive index of the polymer layer 101 may change depending on a draw ratio. Generally, as a draw ratio increases, a refractive index increases. A refraction index of the copolymer 103 is not changed by a draw process.

Meanwhile, an incident plane of the multi-layered sheet 110 onto which the light is incident may be formed of the copolymer layer 103 or the polymer layer 101. An emission plane of the multi-layered sheet 110 from which the light that has passed through the multi-layered sheet 110 is emitted may be formed of the copolymer layer 103 or the polymer layer 101.

The polymer layer 101 includes polyethylene terephthalate (PET). The copolymer 103 includes PET and at least one selected from the group consisting of PTT, PEN, PET copolymer, PTT copolymer, and PEN copolymer.

In an embodiment, the copolymer layer 103 may be formed by mixing and polymerizing more than 50 w %, e.g., about 80 w % of PET, and less than 50 w %, e.g., about 20 w % of an additional member. The additional member may be formed of PEN. In the case where the polymer layers 101 of the optical film 100 are formed of PET, it is preferable that the copolymer layers 103 alternately arranged with the polymer layers 101 be formed of a PET copolymer. The polymer layer 101 and the copolymer layer 103 constituting the optical film 100 may be formed of at least one layer or of several tens to several thousands of layers which are alternately arranged.

A difference between the first refractive index n1 of the polymer layer 101 and the third refractive index n3 of the copolymer layer 103 may be 0.01 or more. A difference between the first refractive index n1 of the polymer layer 101 and the third refractive index n3 of the copolymer layer 103 may be 0.05 or more. A difference between the first refractive index n1 of the polymer layer 101 and the third refractive index n3 of the copolymer layer 103 may be 0.1 or more. A difference between the first refractive index n1 of the polymer layer 101 and the third refractive index n3 of the copolymer layer 103 may be 0.2-0.5.

Figure 3:
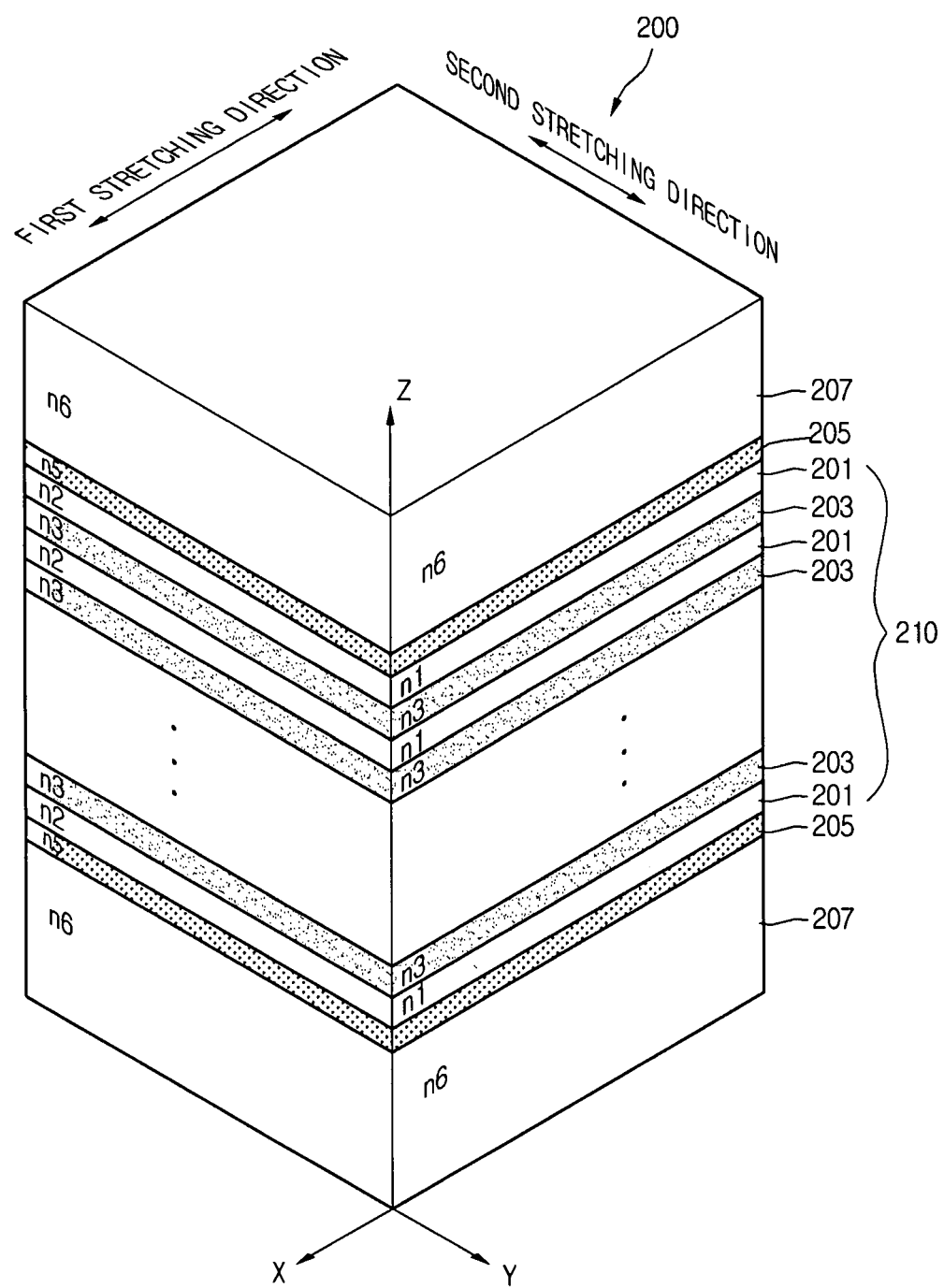
FIG. 3 shows a perspective view of an optical film according to a second embodiment of the invention.

FIG. 3 shows a perspective view of an optical film according to another embodiment of the invention. Referring to FIG. 3, the optical film 200 includes a multi-layered sheet 210 having a plurality of polymer layers 201 and a plurality of copolymer layers 203. Herein, the polymer layer 201 has a first refractive index n1 along a first stretching direction, and a second refractive index n2 along a second stretching direction. The plurality of copolymer layers 203 are alternately arranged with the plurality of polymer layers 201, wherein the copolymer layer 203 has a third refractive index n3 along the first and second stretching directions.

The optical film 200 further includes a protection sheet 207 formed on at least one side of the multi-layered sheet 210. In addition, the optical film 200 further includes an adhesive member 205 interposed between the multi-layered sheet 210 and the protection sheet 207. The adhesive member 205 has a fifth refractive index n5 that is smaller than an sixth refractive index n6 of the protection sheet 207.

The protection sheet 207 may be formed of a copolymer layer or a polymer layer. The protection sheet 207 is formed of a copolymer layer or a polymer layer. The protection sheet 207 may include polyester-based material The polyester-based material includes at least one selected from the group consisting of PET, PTT, PEN, PET copolymer, PTT copolymer, and PEN copolymer. The protection sheet 207 includes at least one of the polymer layer and the copolymer layer.

For example, in the case where the protection sheet 207 is formed of the copolymer constituting the multi-layered sheet 210, affinity between the protection sheet 207 and the multi-layered sheet 210 increases. Therefore, it is possible to prevent wrinkle generation on the film and exfoliation of the protection sheet 207 from the multi-layered sheet 210.

The fifth refractive index n5 of the adhesive member 205 may be substantially equal to the sixth refractive index n6 of the protection sheet 207. The fifth refractive index n5 of the adhesive member 205 may be smaller than the sixth refractive index n6 of the protection sheet 207. The protection sheet 207 may have a thickness of 50-200 μm. Also, the thickness of the protection sheet 207 may be substantially equal to the thickness of the multi-layered sheet 210.

Meanwhile, in the multi-layered sheet 210, a difference between the first refractive index n1 and the third refractive index n3 is greater than a difference between the second refractive index n2 and the third refractive index n3. The first refractive index n1 is greater than the third refractive index n3, the second refractive index n2 is greater than the third refractive index n3, and the first refractive index n1 is greater than the second refractive index n2.

The polymer layer 201 of the optical film 200 has a characteristic that its refractive index changes along one axis direction by a draw process. Therefore, the polymer layer 201 has birefringence that its refractive index changes along a stretching direction. The refractive index of the polymer layer 201 can change depending on a draw ratio. Generally, as a draw ratio increases, a refractive index increases. For example, the multi-layered sheet 210 is drawn so that a draw ratio along the first stretching direction becomes n (n>0) and a draw ratio along the second stretching direction becomes m (m>0). The refractive index of the multi-layered sheet 210 changes depending on the draw ratio.

The first and second stretching directions may be perpendicular to each other on one plane, or other directions may also be allowed. In the case where the draw ratio n along the first stretching direction is greater than the draw ratio m along the second stretching direction, the polymer layer 201 has the first refractive index n1 along the first stretching direction on the plane, and has the second refractive index n2 along the second stretching direction. At this point, the copolymer layers 203 alternately arranged with the polymer layers 201 have the third refractive index n3 in the first and second stretching directions.

Assuming that one axis on the plane of the multi-layered sheet 210 is an X-axis, a perpendicular axis on the plane including the X-axis is an Y-axis, an axis perpendicular to the plane is a Z-axis, the first stretching direction is parallel to the X-axis, and the second stretching direction is parallel to the Y-axis. Since the polymer layer 201 has the first refractive index n1 along the X-axis, the second refractive index n2 along the Y-axis, and the third refractive index n3 (not determined) along the Z-axis, the polymer layer 201 may have a birefringence property. The refractive index of the protection sheet 207 along the X-axis may be the same as the refractive index of the protection sheet 207 along the Y-axis.

Meanwhile, the multi-layered sheet 210 in which the copolymer layers 203 and the polymer layers 201 are alternately arranged has such a characteristic that it reflects most of the first light component and transmits most of the second light component. For example, the optical film 200 transmits P-waves of the components of light generated from a lamp toward an LCD panel, and reflects S-waves toward a light guide plate.

Also, the S-waves reflected by the optical film 200 are reflected toward the optical film 200 by a reflector (not shown) disposed on the rear side of the optical film 200. During this process, the S-waves are converted into P-waves and pass through the optical film 200 again, so that light efficiency is improved on the whole.

For example, the first light component and the second light component are perpendicular to each other and vibrate with respect to a propagation direction. Light incident onto the optical film 200 has a propagation direction parallel to the Z-axis or the (−) Z-axis. The first light component and the second light component propagate while vertically vibrating in a direction of an X-Y plane perpendicular to the Z-axis. In the light incident on the multi-layered sheet 210, the first component is reflected but the second light component passes through the multi-layered sheet 210.

In an embodiment, the vibration direction of the first light component may be identical to the first stretching direction, and the vibration direction of the second light component may be identical to the second stretching direction. The reflected first light component is reflected by the reflector and is re-incident to the optical film 200. The first light component of the re-incident light passes through the multi-layered sheet 210, and the second light component is reflected again. The reflected second light component is reflected at the reflector, and is re-incident to the optical film 200. The first light component of the re-incident light passes through the multi-layered sheet 210, and the second light component is reflected again. In this manner, the optical film 200 selectively reflects and transmits the incident light. The reflected light is re-incident, and only the first light component of the reflected light is selectively transmitted so that the brightness is increased on the whole.

Meanwhile, an incident plane of the multi-layered sheet 210 may be formed of one of the copolymer layer 203 and the polymer layer 201. An emission plane of the multi-layered sheet 210, through which the light passing through the multi-layered sheet 210 is emitted, may also be formed of one the copolymer layer 203 and the polymer layer 201.

The polymer layer 201 includes PET. The copolymer 203 includes PET and at least one selected from the group consisting of PTT, PEN, PET copolymer, PTT copolymer and PEN polymer. In an embodiment, the copolymer 203 may be prepared by mixing and copolymerizing 50 w % PET or more, e.g., approximately 80 w % PET, and 50 w % additional member or less, e.g., approximately 20 w % additional member. The additional member may include PEN.

When employing PET as the polymer layer 201 of the optical film 200, it is preferable that the copolymer layer 203 alternately arranged with the polymer layer 201 be formed of PET copolymer. The polymer layer 201 and the copolymer layer 203 constituting the optical film 200 may be formed of at least one layer or of several tens to several thousands of layers which are alternately arranged.

A difference between the first refractive index n1 of the polymer layer 201 and the third refractive index n3 of the copolymer layer 203 may be 0.01 or more. For example, a difference between the second refractive index n1 of the polymer layer 201 and the third refractive index n3 of the copolymer layer 203 may be 0.05 or more. Alternatively, a difference between the first refractive index n1 of the polymer layer 201 and the third refractive index n3 of the copolymer layer 203 may be 0.1 or more. For example, a difference between the first refractive index n1 of the polymer layer 201 and the third refractive index n3 of the copolymer layer 203 may be 0.2-0.5.

The multi-layered sheet 210 in which the polymer layers 201 and the copolymer layers 203 are alternately arranged may be uniaxially drawn in the first stretching direction.

A difference between the second refractive index n2 and the third refractive index n3 of the copolymer layers 203 may be 0.1 or less. For example, a difference between the second refractive index n2 and the third refractive index n3 of the copolymer layers 203 may be 0.05 or less. Alternatively, a difference between the second refractive index n2 and the third refractive index n3 of the copolymer layers 203 may be 0.01-0.

The multi-layered sheet 210 in which the polymer layers 201 and the copolymer layers 203 are alternately arranged may be uniaxially drawn in the first stretching direction. Also, the multi-layered sheet 210 in which the polymer layers 201 and the copolymer layers 203 are alternately arranged may be biaxially drawn. That is, the multi-layered sheet 210 is drawn in the first stretching direction first, and it is then drawn in the second stretching direction.

In the case where the multi-layered sheet 210 is drawn at least one time in different directions, a successive thermal fixing process is performed. At this time, the multi-layered sheet 210 may shrink in width or length due to residual stress existing inside the multi-layered sheet 210. According an embodiment of the present invention, however, defects such as wrinkling and bending do not occur even if the shrinkage phenomenon occurs due to the residual stress, and a mechanical characteristic of the optical film 200 is reinforced.

Also, the protection sheet 207 formed of a polymer or a copolymer is formed on the upper and lower surfaces of the multi-layered sheet 210 to increase affinity between the protection sheet 207 and the multi-layered sheet 210, and thus it is possible to solve the defect of exfoliation of the protection sheet 207 from the multi-layered sheet 210.

Here, although the biaxial draw of the first and second draws has been illustrated in the embodiment, a draw process can be performed two or more times to improve the characteristic of the optical film according to an embodiment of the invention. Though the stretching directions may be perpendicular to each other, other directions may also be allowed.

Since the multi-layered sheet 210 is drawn with physical force, it may shrink in a direction opposite to the stretching direction due to the residual internal stress before a thermal fixing process.

This shrinkage of the optical film 200 may change the characteristic of the film to degrade optical characteristic or cause unexpected phenomenon. However, according to an embodiment of the invention, it is possible to manufacture a wrinkle-free or bending-free optical film having excellent thermal durability and excellent mechanical strength even when the optical film shrinks due to the biaxial draw or multi-axial draw.

Figure 4:
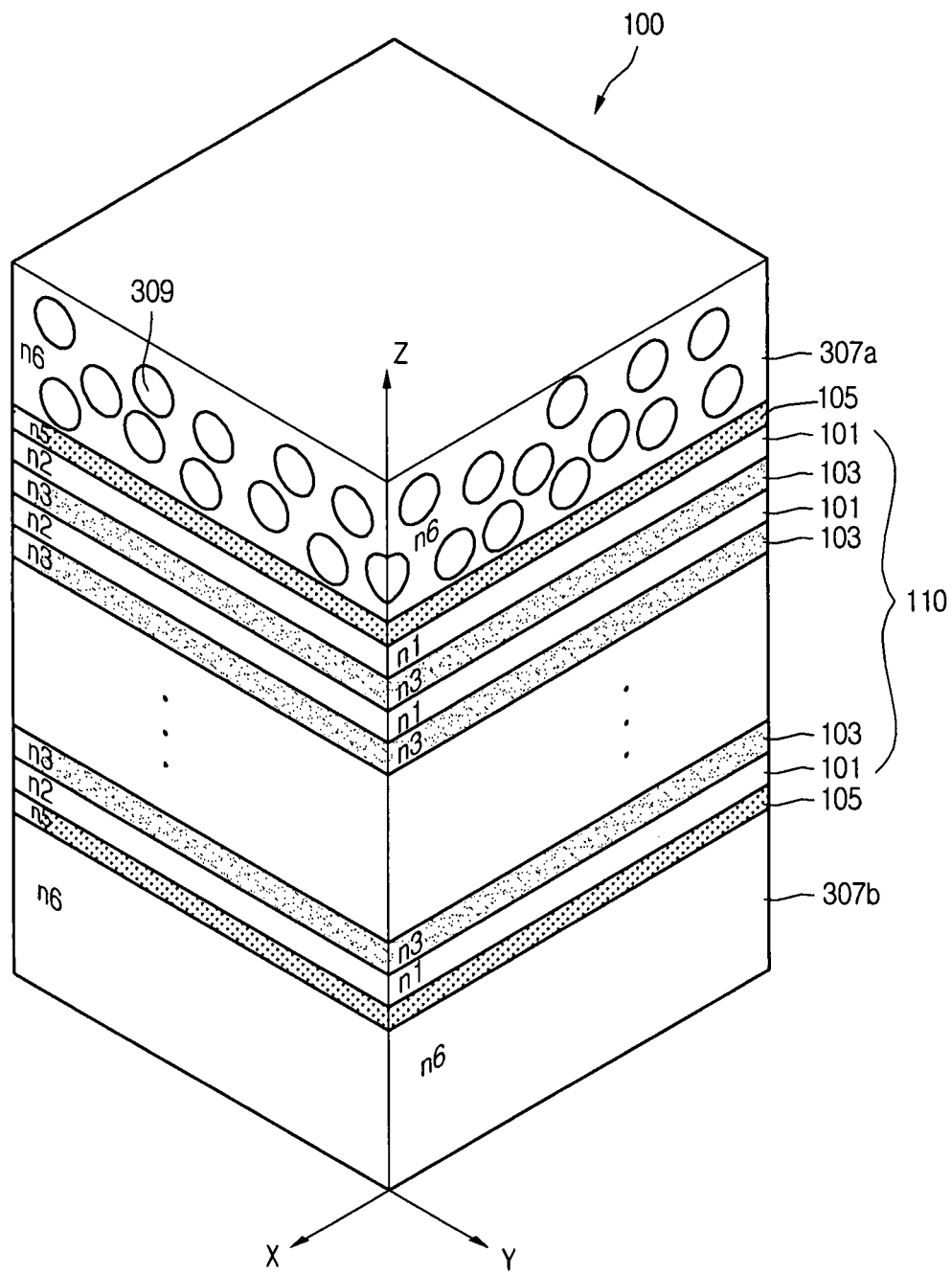
FIG. 4 shows a perspective view of an optical film according to a third embodiment of the invention.

FIG. 4 shows a perspective view of an optical film according to a third embodiment of the invention. Here, since the optical film of FIG. 4 is substantially similar to the optical film of FIG. 1, detailed description of the same or like parts will be omitted.

In the optical film 100, a first protection sheet 307a and a second sheet 307b are formed on an upper surface and a lower surface of the multi-layered sheet 110, respectively. In addition, the optical film 100 may further include adhesive members 105 interposed between the multi-layered sheet 110 and the first protection sheet 307a and between the multi-layered sheet 110 and the second protection sheet 307b. The first and second protection sheets 307a and 307b may include a copolymer layer or a polymer layer.

The first protection sheet 307a, which is an incident plane of the light, may include inorganic particles 309. The inorganic particles 309 may include at least one selected from the group consisting of silica, titanium oxide ($TiO_2$) and calcium carbonate ($CaCO_3$).

The optical film including the protection sheet containing the inorganic particles 309 diffuses light incident onto the optical film to prevent partial concentration of light and allow light to be uniformly illuminated onto the LCD panel. The optical film having the above-described structure can be manufactured as described below.

First, a molten polymer material and a molten copolymer material are extrusion-molded to form the plurality of polymer layers 101 and copolymer layers 103 alternately stacked with the polymer layers 101. The stacked polymer layers 101 and copolymer layers 103 are feedback to overlap at least one time and form the multi-layered sheet 110. The polymer layer 101 has the same refractive index n3 with respect to the X-Y plane, and the copolymer layer 103 has the same refractive index n3 with respect to the X-Y plane.

Thereafter, the multi-layered sheet 110 is drawn along the first stretching direction so that the first polymer layer 101 has a first refractive index n1 along the first stretching direction, and the second polymer layer 103 has a third refractive index n3 along the first stretching direction.

At this point, the first stretching direction is parallel to the X-axis, and the thicknesses of the polymer layer 101 and the copolymer layer 103 constituting the multi-layered sheet 110 are reduced in the Z-axis by the draw process. The length of the multi-layered sheet 110 is elongated three times to eight times in the first stretching direction.

Afterwards, as an optional operation, the multi-layered sheet 110 are elongated by 0.1-1.5 times in the second stretching direction on the plane so that the polymer layer 101 has the second refractive index n2 along the second stretching direction, and the copolymer layer 103 has the third refractive index n3 along the second stretching direction.

In an embodiment, the first stretching direction and the second stretching direction may be perpendicular to each other. In another embodiment, the first stretching direction may cross the second stretching direction at any angle other than 90 degrees.

After that, a process of thermally fixing the multi-layered sheet 110 is performed. Finally, the first and second protection sheets 307a and 307b are disposed on the upper and lower surfaces of the multi-layered sheet 110, respectively, and the adhesive members 105 are interposed between the multi-layered sheet 110 and the first and second protection sheets 307a and 307b.

The adhesive member 105 may include acryl-based or polyester-based material. The adhesive member 105 is employed as an optional means to form the protection sheets 307a and 307b on one surface of the multi-layered sheet 110. A method for forming the protection sheets 307a and 307b on one surface of the multi-layered sheet 110 may be performed in various manners.

Figure 5:
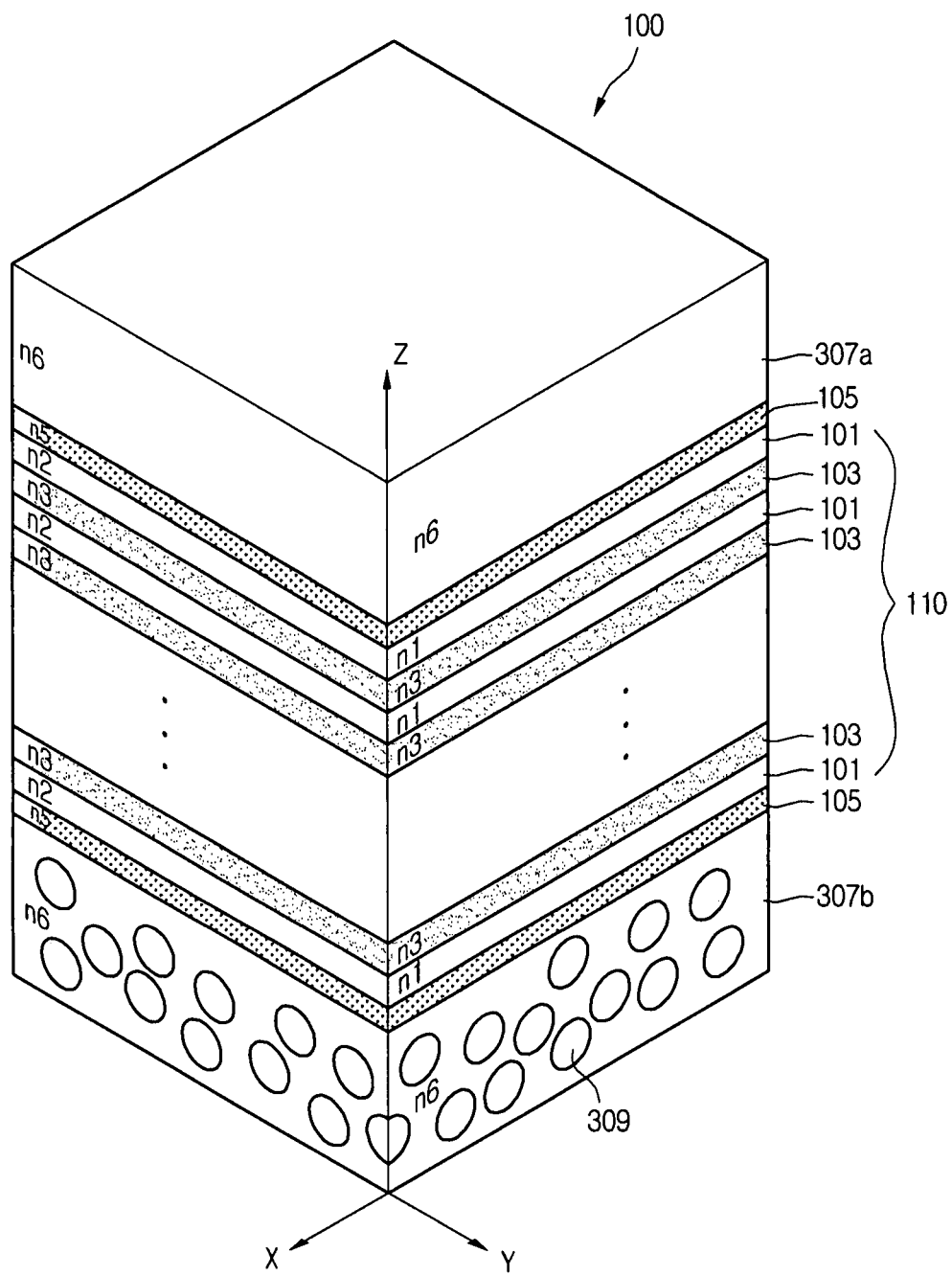
FIG. 5 shows a perspective view of an optical film according to a fourth embodiment of the invention.

FIG. 5 shows a perspective view of an optical film according to a fourth embodiment of the invention. Here, since the optical film of FIG. 5 is substantially similar to the optical film of FIG. 4, detailed description of the same or like parts will be omitted. Referring to FIG. 5, the first protection sheet 307a and the second sheet 307b are formed on an upper surface and a lower surface of the multi-layered sheet 110, respectively. In addition, the optical film 100 may further include adhesive members 105 interposed between the multi-layered sheet 110 and the first protection sheet 307a and between the multi-layered sheet 110 and the second protection sheet 307b. The first and second protection sheets 307a and 307b may include a copolymer layer or a polymer layer. The second protection sheet 307b, which is an emission plane of the light, may include inorganic particles 309.

Figure 6:
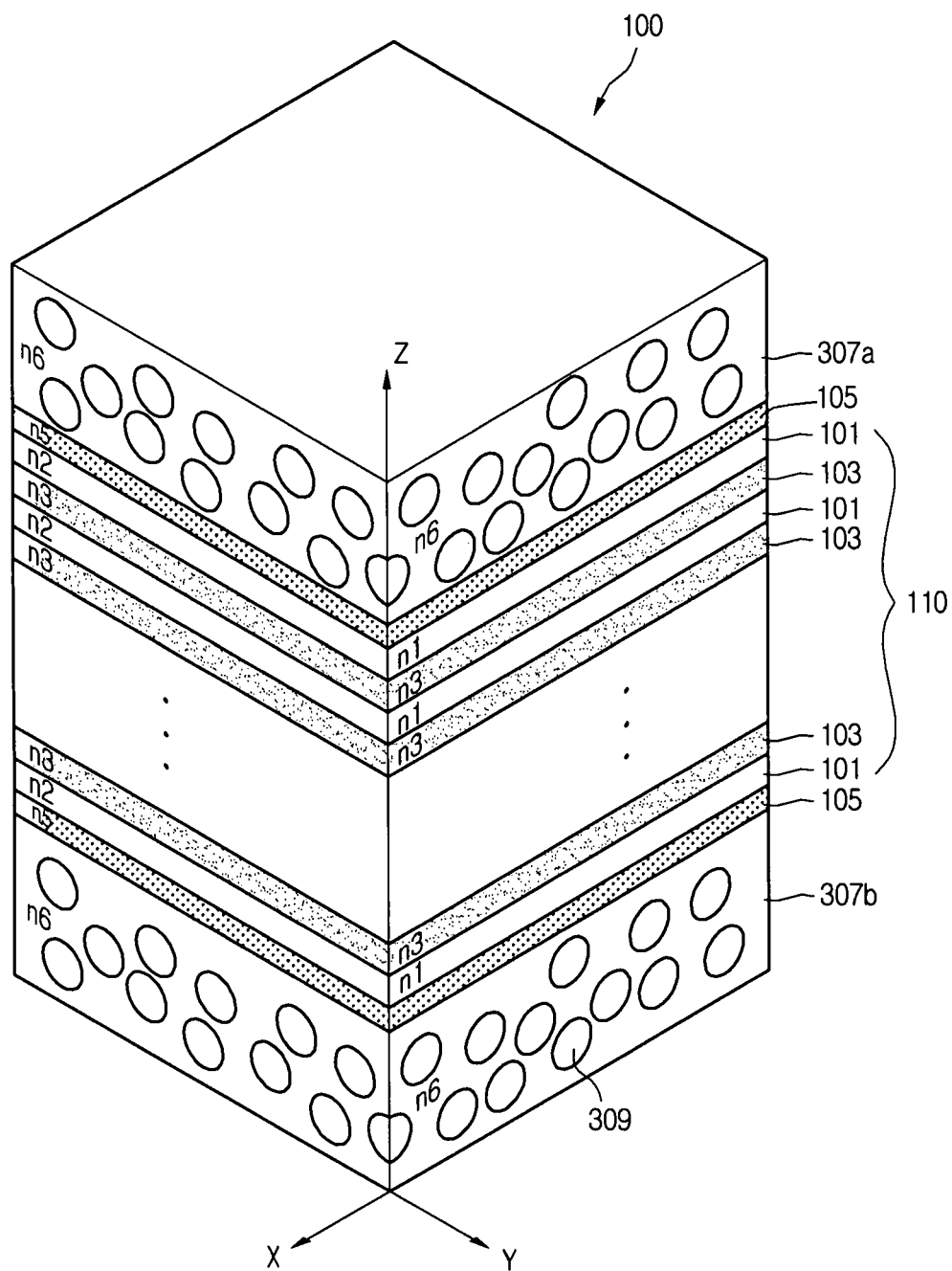
FIG. 6 shows a perspective view of an optical film according to a fifth embodiment of the invention.

FIG. 6 shows a perspective view of an optical film according to a fifth embodiment of the invention. Here, since the optical film of FIG. 6 is substantially similar to the optical film of FIG. 4, detailed description of the same or like parts will be omitted. Referring to FIG. 6, the first protection sheet 307a and the second sheet 307b are formed on an upper surface and a lower surface of the multi-layered sheet 110, respectively. In addition, the optical film 100 may include adhesive members 105 interposed between the multi-layered sheet 110 and the first protection sheet 307a and between the multi-layered sheet 110 and the second protection sheet 307b. The first and second protection sheets 307a and 307b may include a copolymer layer or a polymer layer. The first protection sheet 307a acts as an incident plane of light, and the second protection sheet 307b acts as an emission plane of light. Each of the first and second protection sheets 307a and 307b may include inorganic particles 309.

Figure 7:
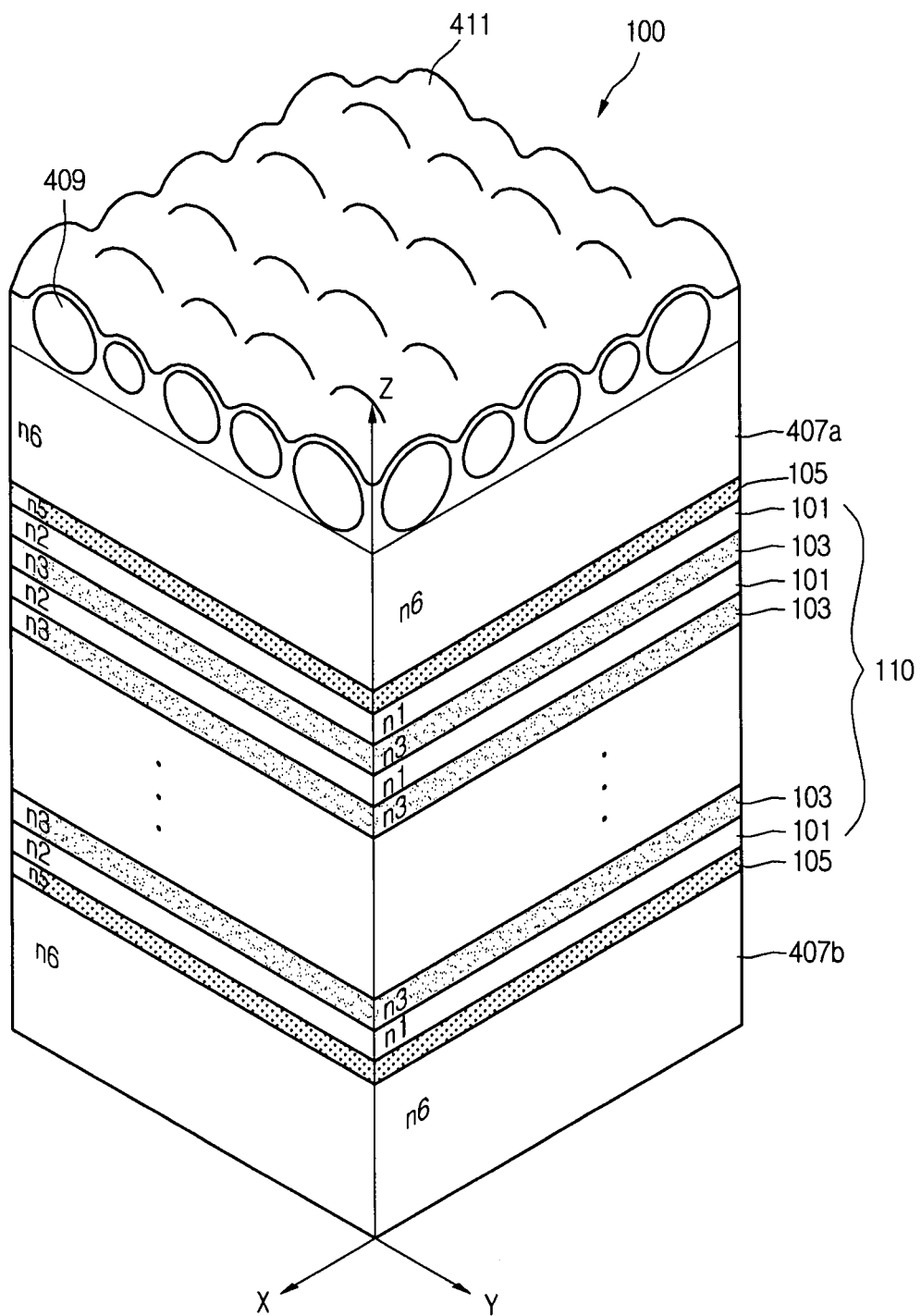
FIG. 7 shows a perspective view of an optical film according to a sixth embodiment of the invention.

FIG. 7 is a perspective view of an optical film according to a seventh embodiment of the invention. Here, since the optical film of FIG. 7 is substantially similar to the optical film of FIG. 6, detailed description of the same or like parts will be omitted.

A multi-layered sheet and a protection sheet may have the same materials, shapes and position relations as those in the optical film of FIG. 1 that has been described already. In the optical film 100, a first protection sheet 407a and a second sheet 407b are formed on an upper surface and a lower surface of the multi-layered sheet 110, respectively.

In addition, the optical film 100 may further include adhesive members 105 interposed between the multi-layered sheet 110 and the first protection sheet 407a and between the multi-layered sheet 110 and the second protection sheet 407b. The first and second protection sheets 407a and 407b may include a copolymer layer or a polymer layer.

The first protection sheet 407a serves as an incident plane of light, and a diffusion member 411 is further provided on the first protection sheet 407a. The diffusion member 411 may be a transparent polymer layer including inorganic particles 409. The inorganic particles 409 include at least one selected from the group consisting of silica, $TiO_2$, and $CaCO_3$. The optical film 100 including the diffusion member 411 diffuses light incident onto the optical film 100 to prevent partial concentration of light and allow light to be uniformly illuminated onto an LCD panel.

Figure 8:
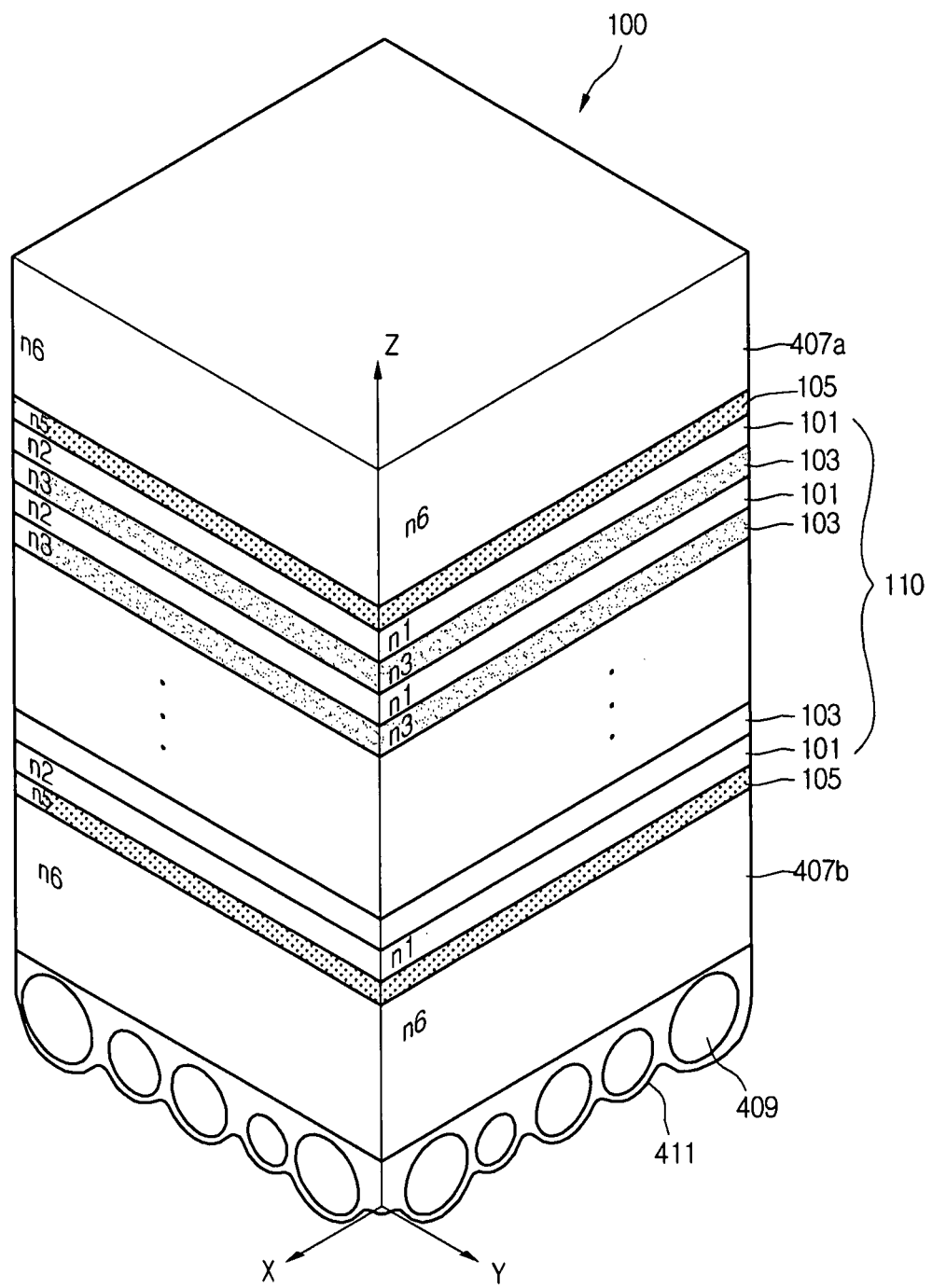
FIG. 8 shows a perspective view of an optical film according to a seventh embodiment of the invention.

FIG. 8 shows a perspective view of an optical film according to a seventh embodiment of the invention. Here, since the optical film of FIG. 8 is substantially similar to the optical film of FIG. 7, detailed description of the same or like parts will be omitted. The optical film 100 includes the first protection sheet 407a and the second protection sheet 407b formed on the upper and lower surfaces of a multi-layered sheet 110, respectively. In addition, the optical film 100 may further include adhesive members 105 interposed between the multi-layered sheet 110 and the first protection sheet 407a and between the multi-layered sheet 110 and the second protection sheet 407b. The first and second protection sheets 407a and 407b may include a copolymer layer or a polymer layer.

The second protection sheet 407b serves as an emission plane of light, and a diffusion member 411 is further provided on the second protection sheet 407b. The diffusion member 411 is a transparent polymer layer including inorganic particles 409. The inorganic particles 409 include at least one selected from the group consisting of silica, $TiO_2$, and $CaCO_3$.

Figure 9:
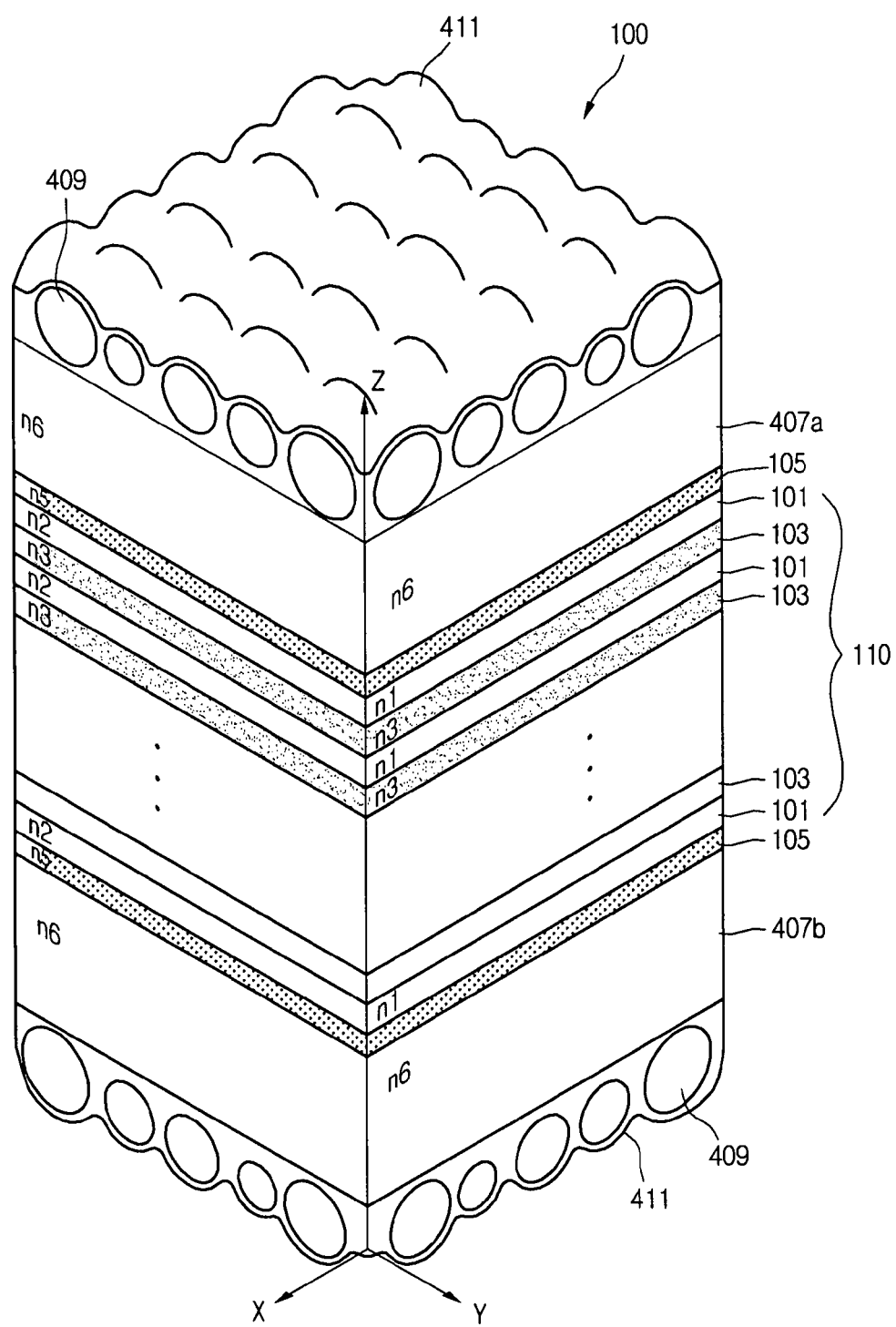
FIG. 9 shows a perspective view of an optical film according to an eighth embodiment of the invention.

FIG. 9 is a perspective view of an optical film according to an eighth embodiment of the invention. Here, since the optical film of FIG. 9 is substantially similar to the optical film of FIG. 7, detailed description of the same or like parts will be omitted.

Though the materials, the shapes, and the position relation of the multi-layered sheet and the protection sheet shown in FIG. 9 have not described in detail, these characteristics are the substantially the same as those described in relation to FIG. 1.

The optical film 100 includes a first protection sheet 407a and a second protection sheet 407b formed on the upper and lower surfaces of a multi-layered sheet 110, respectively. In addition, the optical film 100 may include adhesive members 105 interposed between the multi-layered sheet 110 and the first protection sheet 407a and between the multi-layered sheet 110 and the second protection sheet 407b. The first and second protection sheets 407a and 407b may include a copolymer layer or a polymer layer.

The first protection sheet 407a serves as an incident plane of light, and the second protection sheet 407b serves as an emission plane of light. Diffusion members 411 are further formed on the first and second protection sheets 407a and 407b, respectively. The diffusion members 411 are transparent polymers layer including inorganic particles 409. The inorganic particles 409 include at least one selected from the group consisting of silica, $TiO_2$, and $CaCO_3$. The optical film 100 including the diffusion member 411 diffuses light incident onto the optical film 100 to prevent partial concentration of light and allow light to be uniformly illuminated onto an LCD panel.

Figure 10:
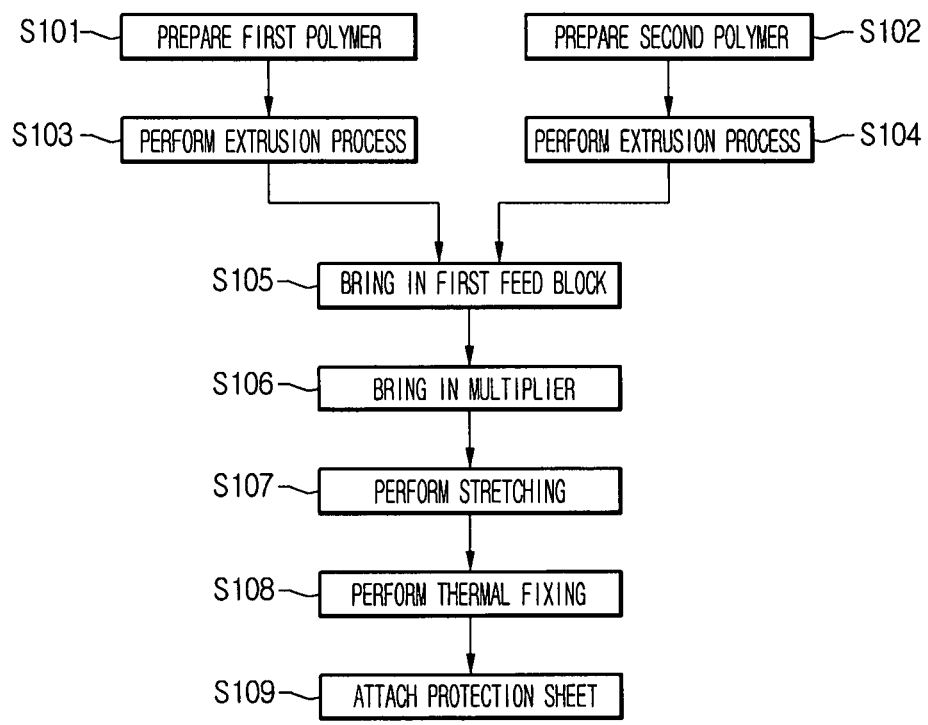
FIG. 10 shows a flowchart illustrating a manufacturing method of the optical film according to an embodiment of the invention.

FIG. 10 is a flowchart of a method for manufacturing an optical film according to an embodiment of the invention. First, steps S101 and S102, a first polymer and a second polymer are prepared. The first polymer may be PET, for example. The second polymer may be co-PET, for example, manufactured by co-polymerizing the first polymer. The second polymer may be formed by mixing and polymerizing more than 50 w %, e.g., about 80 w % of PET, and less than 50 w %, e.g., about 20 w % of an additional member. The additional member may be PEN.

Thereafter, at step S103, the first polymer is carried into a first extruder and melted. The molten first polymer is extrusion-processed in a film shape and carried from the extruder.

Simultaneously, at step S104, the second polymer is carried into a first extruder and melted. The molten first polymer is extrusion-processed in a layer shape and carried from the extruder.

The extrusion-processed first polymer layers and the extrusion-processed second polymer layers are carried into a first feed block, and the first polymer layers and the second polymer layers are alternately stacked.

At step S105, the first feed block is an equipment used for making a film having a multi-layered structure. The first and second polymer layers are alternately stacked without being mixed. For example, preliminary multi-layered sheets in which the first polymer layers and the second polymer layers are alternately stacked may have a 220-layered structure.

The preliminary multi-layered sheets brought from the first feed block are carried into a multiplier. The preliminary multi-layered sheets carried into the multiplier are mutually stacked. Accordingly, the number of layers of the preliminary multi-layered sheet reaches several times the original number of layers.

For example, a preliminary multi-layered sheet having a 220-layered structure in which the first polymer layers and the second polymer layers are alternately stacked is stacked in a four-layered structure again to form a multi-layered sheet having a 880-layered structure.

Afterwards, at step S106, the multi-layered sheet brought from the multiplier is drawn.

At step S107, a draw process of the multi-layered sheet may be performed in uniaxial direction or multi-axial direction. The draw process of the multi-layered sheet may be performed one time or several times.

For example, a first draw process and a second draw process may be performed on the multi-layered sheet. Before the draw process, the multi-layered sheet has the same refractive index in an X-axis and a Y-axis on the plane of the first polymer layer. Also, the multi-layered sheet has the same refractive index in an X-axis and a Y-axis on the plane of the second polymer layer. Also, the refractive index of the first polymer layer may be substantially equal to the refractive index of the second polymer layer. The first draw process is to elongate the multi-layered sheet in a first stretching direction. The first stretching direction may be the same direction as a movement direction of the multi-layered sheet. Unlike this, the first stretching direction may be a direction different from a movement direction of the multi-layered sheet. The refractive index of the drawn first polymer layer changes along the first stretching direction so that the first polymer layer has a first refractive index n1. The drawn second polymer layer has a refractive index that does not change even when the second polymer layer is drawn along the first stretching direction.

After that, the first drawn multi-layered sheet is secondly drawn. The second draw process is to elongate the first drawn multi-layered sheet in a second stretching direction different from the first stretching direction. The second stretching direction may be perpendicular to the first stretching direction. The multi-layered sheet is drawn in the second stretching direction on the plane, so that the polymer layer has a second refractive index n2 along the second stretching direction, and the copolymer layer has a third refractive index n3 along the second stretching direction. Meanwhile, the multi-layered sheet may be drawn several times in a predetermined direction as well as the first and second stretching directions.

The mechanical characteristic of the multi-layered sheet is reinforced while the first and second draw processes are performed. Also, the multi-layered sheet according to an embodiment of the present invention has an advantage that its optical characteristic change little even when the film is contracted or expanded due to an external environmental factor.

There can be various combinations in directions of the first and second draw processes. Also, there can be various combinations in draw ratios of the multi-layered sheet during the first and second draw processes.

For example, the multi-layered sheet has a draw ratio of n (n>0) along the first stretching direction. The length of the multi-layered sheet is elongated in the stretching direction three times to eight times more than the original length. Also, a draw ratio along the second stretching direction is m (n>m), and the length of the multi-layered sheet is further elongated in the second stretching direction by 0.1-1.5 times more than the original length.

Further for example, the multi-layered sheet may be elongated in the first stretching direction by 0.1-1.5 times more than the original length, and elongated in second stretching direction by 3-8 times more than the original length. That is, the multi-layered sheet has a draw ratio p (p>0) in the first stretching direction, and a draw ratio q (q>p) in the second stretching direction. A difference between the first refractive index and the third refractive index may be greater than a difference between the second refractive index and the third refractive index.

After that, at step S108, a process of thermally fixing the multi-layered sheet is performed.

Finally, at step S109, a protection sheet is attached on at least one side of the multi-layered sheet to complete the manufacturing process of the optical film.

The protection sheet includes at least one selected from the group consisting of PET, PTT, PEN, PET copolymer, PTT copolymer, and PEN copolymer.

The protection sheet may be formed of the same material as the first polymer layer. The protection sheet may be formed of the same material as the second polymer layer.

The protection sheet includes inorganic particles so that it may play a role in diffusing the light passing through the optical film.

The protection sheet is attached on the sheet with the adhesive member interposed therebetween.

The adhesive member may be formed on one side of the protection sheet. Thereafter, the surface with the adhesive member formed may be attached on the multi-layered sheet to thereby form the optical film.

Alternatively, after forming the adhesive member on one side of the multi-layered sheet, the protection sheet may be attached on one side of the adhesive member.

The adhesive member is interposed between the multi-layered sheet and the protection sheet, and has a refractive index which is substantially equal to or smaller than that of the protection sheet.

Figure 11:
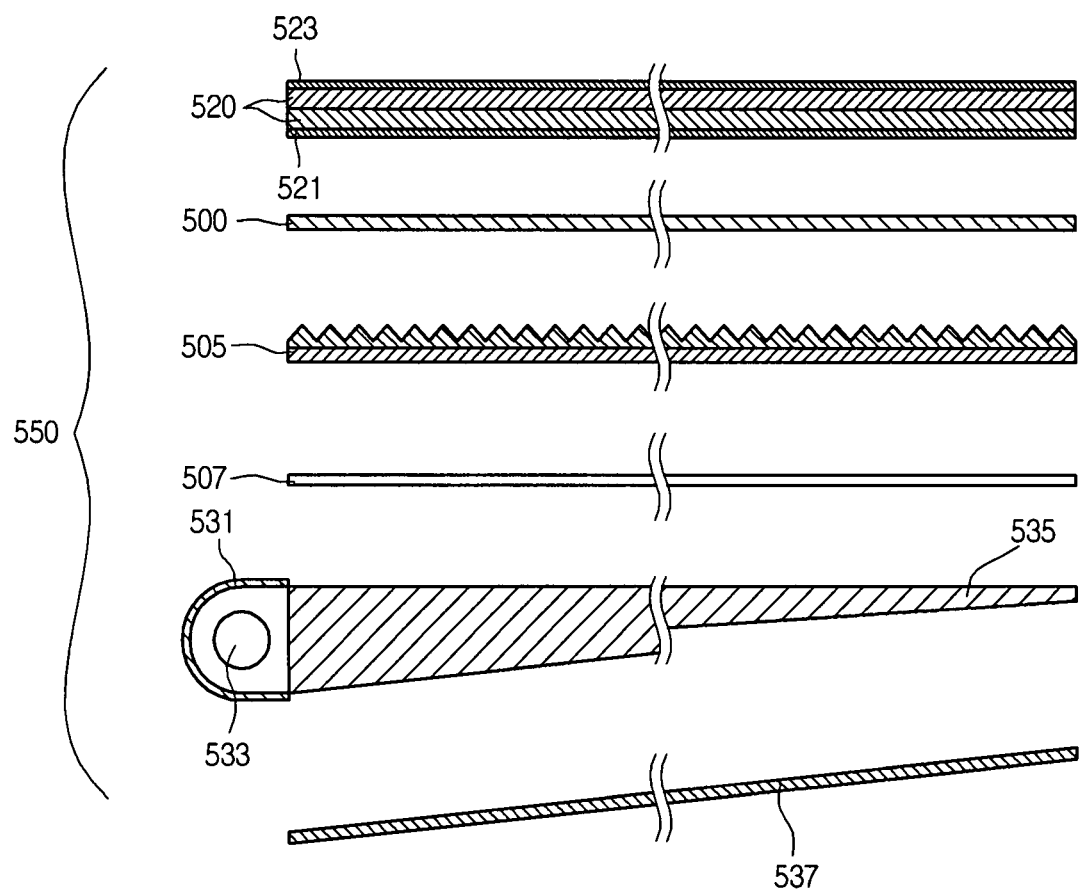
FIG. 11 shows a cross-sectional view of a liquid crystal display device according to an embodiment of the invention.

FIG. 11 shows a cross-sectional view of an LCD device according to an embodiment of the present invention. Referring to FIG. 11, the LCD device includes an LCD panel 520, and a backlight assembly 550 disposed on the rear side of the LCD panel 520 to illuminate light onto the LCD panel 520. An upper polarizer 523 and a lower polarizer 521 are further provided on the upper and lower sides of the LCD panel 520.

The backlight assembly 550 includes a lamp 533 severing as a light source, a light guide plate 535 for guiding light from the lamp 533 to the LCD panel 520, and a plurality of optical sheets for improving brightness. The lamp 533 is disposed on the lateral side of the light guide plate 535. Light emitted from the lamp 533 is incident into the light guide plate 535 through the lateral side of the light guide plate 535. Also, a lamp reflector 531 is installed on the lateral side of the light guide plate 535 with the lamp 533 interposed therebetween, to reflect a portion of light emitted from the lamp 533 that is not directed to the lateral side of the light guide plate 535 toward the light guide plate 535, which makes it possible to improve light efficiency.

The light guide plate 535 allows light incident from the lamp 533 to be directed to the LCD panel 520 disposed on the front side of the light guide plate 535. A variety of patterns such as fine dot patterns for rendering the light to be directed toward the LCD panel 520 are printed on the rear side of the light guide plate 535.

A reflector 537 is generally disposed below the light guide plate 535 to reflect light emitted to a rear side from the light guide plate 535 toward the light guide plate 535 to improve light efficiency.

A diffusion sheet 507, a prism sheet 505, and an optical film 500 for improving light efficiency are disposed between the light guide plate 535 and the LCD panel 520.

The optical film 500 has been already described in the first to eight embodiments.

The diffusion sheet 507 diffuses light incident from the light guide plate 535 to prevent partial concentration of light and allow light to be uniformly illuminated onto the LCD panel 520.

The prism sheet 505 includes a plurality of prism patterns having a predetermined pitch and formed on the surface of the LCD panel 520 to condense the light diffused by the diffusion sheet 507 onto the LCD panel 520 and improve front brightness.

The optical film 500 repeatedly reflects and transmits light incident from the light guide plate 535 to improve light efficiency and thus improve brightness of the LCD device on the whole.

For example, the optical film 500 transmits P-waves of the components of light generated from the lamp 533 to the LCD panel 510, and reflects S-waves to the light guide plate 535.

Also, the S-waves reflected by the optical film 500 are reflected by a reflector disposed on the rear side of the optical film 500 back to the optical film 500. During this process, the S-waves are converted into P-waves and pass through the optical film 500 again, so that light efficiency is improved on the whole.

In an embodiment, the lower polarizer 521 has the same polarization axis direction as the vibrating direction of light, e.g., P-waves that pass through the optical film 500.

Therefore, P-waves that have passed through the optical film 500 immediately pass through the lower polarizer 521 and are incident onto the LCD panel 520 and used for displaying an image. Consequently, brightness can be improved on the whole.

The backlight assembly 550 is shown in FIG. 11 as a side-type backlight unit. Although not shown, the backlight assembly 550 may be of a direct-type backlight unit and may have one or more light sources above the reflector 537 or in the same plane as the reflector 537.

Also, assuming that the same backlight power is used, light efficiency is excellent in the case where the above-described optical film is used rather than the case where the above-described optical film is not used. Therefore, backlight power can be saved.

According to an embodiment of the present invention, an optical film in which polymer layers and copolymer layers are alternately stacked is drawn in the first and second stretching directions, so that mechanical strength and a thermal durability characteristic can be enhanced.

In addition, according to an embodiment of the present invention, it is possible to improve entire brightness and image quality of the LCD device.

Furthermore, since an LCD device according to an embodiment of the present invention has excellent light efficiency, backlight power can be saved.

Also, according to an embodiment of the present invention, since a protection sheet is formed using a polymer layer or a copolymer layer constituting an optical film, affinity between the protection sheet and a multi-layered sheet increases, defects such as wrinkle generation on the film and exfoliation of the protection sheet from the multi-layered sheet are reduced.

It will be apparent to those skilled in the art that various modifications and variations can be made in the exemplary embodiments of the present invention. Thus, it is intended that the present invention covers the modifications and variations of the exemplary embodiments provided they come within the scope of the appended claims and their equivalents.

What is claimed is:

1. An optical film, comprising:
    a multi-layer sheet including:
        a plurality of polyethylene terephthalate polymer layers, the polymer layers having a first refraction index in a first direction parallel to a plane of the polymer layers and a second refraction index in a second direction parallel to the plane of the polymer layers; and
        a plurality of polyethylene terephthalate copolymer layers, the copolymer layers having a third refraction index in the first and second directions,
        wherein the third refraction index is equal to the second refraction index, and
        wherein the polyethylene terephthalate polymer layers and the polyethylene terephthalate copolymer layers are alternatively stacked with each other;
    a protection sheet on at least one side of the multi-layer sheet, a thickness of the protection sheet substantially equal to a thickness of the multi-layer sheet;
    an acryl-based adhesive member between the multi-layer sheet and the protection sheet, the adhesive member comprising a refraction index smaller than a refraction index of the protection sheet; and
    a diffusion member on the protection sheet,
    wherein the diffusion member includes a transparent polymer layer on and directly contacting the protection sheet and a plurality of inorganic particles in the transparent polymer layer,
    wherein the transparent polymer layer includes a plurality of protrusions corresponding to the inorganic particles,
    wherein the protection sheet comprises the co-polymer material
    wherein the thicknesses of the polymer layers gradually increase from the outer side to the center of the polymer layers, wherein the thicknesses of the copolymer layers gradually increase from the outer side to the center of the copolymer layers, and wherein the refractive index formed along the X-axis and a refractive index formed along the Y-axis are equal to each other in the protection sheet.

2. The optical film according to claim 1, wherein the protection sheet includes inorganic particles.

3. The optical film according to claim 2, wherein the inorganic particles include at least one of silica, titanium oxide ($TiO_2$) and calcium carbonate ($CaCO_3$).

4. The optical film according to claim 1, wherein the protection sheet further includes at least one of polyethylene terephthalate, polytrimethylene terephthalate, polyethylene naphthalate, polytrimethylene terephthalate copolymer, and polyethylene naphthalate copolymer.

5. The optical film according to claim 1, wherein each of the copolymer layers includes more than or equal to 50 weight % of polyethylene terephthalate (PET) and less than or equal to 50 weight % of an additive material by copolymerization.

6. The optical film according to claim 1, wherein an upper surface of the transparent polymer layer comprises an embossing shape formed by the inorganic particles.

7. An optical film, comprising:
a multi-layer sheet having a first thickness ranging from about 50 μm to about 200 μm that includes:
polymer layers having a first refraction index in a first direction parallel to a plane of the polymer layer and a second refraction index in a second direction parallel to the plane of the polymer layer; and
copolymer layers having a third refraction index in the first and second directions,
wherein the polymer layers and the copolymer layers are stacked for transmitting a first component of light incident onto the multi-layer sheet and reflecting a second component of the incident light,
wherein the third refraction index is equal to the second refraction index, and
wherein the polymer layers and the copolymer layers are alternatively stacked with each other;
a protection sheet having a second thickness being substantially equal to the first thickness and ranging from about 50 μm to about 200 μm on at least one side of the multi-layer sheet;
an adhesive member between the multi-layer sheet and the protection sheet, the adhesive member comprising a refraction index smaller than a refraction index of the protection sheet; and
a diffusion member on the protection sheet,
wherein the diffusion member includes a transparent polymer layer on and directly contacting the protection sheet and a plurality of inorganic particles in the transparent polymer layer,
wherein the transparent polymer layer includes a plurality of protrusions corresponding to the inorganic particles,
wherein the protection sheet comprises the co-polymer material
wherein the thicknesses of the polymer layers gradually increase from the outer side to the center of the polymer layers,
wherein the thicknesses of the copolymer layers gradually increase from the outer side to the center of the copolymer layers, and
wherein the refractive index formed along the X-axis and a refractive index formed along the Y-axis are equal to each other in the protection sheet.

8. The optical film according to claim 7, wherein the protection sheet includes inorganic particles.

9. The optical film according to claim 8, wherein the inorganic particles include at least one of silica, titanium oxide ($TiO_2$) and calcium carbonate ($CaCO_3$).

10. The optical film according to claim 7, wherein the protection sheet further includes at least one of polyethylene terephthalate, polytrimethylene terephthalate, polyethylene naphthalate, polytrimethylene terephthalate copolymer, and polyethylene naphthalate copolymer.

11. The optical film according to claim 7, wherein the polymer layers include polyethylene terephthalate and the copolymer layers include polyethylene terephthalate and at least one of polytrimethylene terephthalate and polyethylene naphthalate.

12. An optical film, comprising:
a multi-layer sheet having a first thickness ranging from about 50 μm to about 200 μm that includes:
a plurality of polymer layers, the polymer layers including polyethylene terephthalate and having a first refraction index in a first stretching direction parallel to a plane of the polymer layers and a second refraction index in a second stretching direction parallel to the plane of the polymer layers; and
a plurality of copolymer layers, the copolymer layers including polyethylene terephthalate copolymer and having a third refraction index in the first and second stretching directions,
wherein the third refraction index is equal to the second refraction index,
wherein polymer layers and the copolymer layers are alternatively stacked with each other,
a protection sheet having a second thickness being substantially equal to the first thickness and ranging from about 50 μm to about 200 μm on at least one side of the multi-layer sheet;
an adhesive member between the multi-layer sheet and the protection sheet, the adhesive member comprising a refraction index smaller than a refraction index of the protection sheet; and
a diffusion member on the protection sheet,
wherein the diffusion member includes a transparent polymer layer on and directly contacting the protection sheet and a plurality of inorganic particles in the transparent polymer layer,
wherein the transparent polymer layer includes a plurality of protrusions corresponding to the inorganic particles,
wherein the protection sheet comprises the co-polymer material
wherein the thicknesses of the polymer layers gradually increase from the outer side to the center of the polymer layers,
wherein the thicknesses of the copolymer layers gradually increase from the outer side to the center of the copolymer layers, and
wherein the refractive index formed along the X-axis and a refractive index formed along the Y-axis are equal to each other in the protection sheet.

13. The optical film according to claim 12, wherein the polymer layers and the copolymer layers have a varying thickness.

14. The optical film according to claim 13, wherein the polymer layers and the copolymer layers increase in thickness as they go from outside to inside of the multi-layer sheet.

15. The optical film according to claim 13, wherein the polymer layers and the copolymer layers decrease in thickness as they go from outside to inside of the multi-layer sheet.

16. The optical film according to claim 13, wherein the polymer layers and the copolymer layers are alternately stacked.

17. The optical film according to claim 13, wherein the protection sheet includes inorganic particles.

18. The optical film according to claim 17, wherein the inorganic particles include at least one of silica, titanium oxide ($TiO_2$) and calcium carbonate ($CaCO_3$).

19. A liquid crystal display device, comprising:
a liquid crystal display panel for displaying images;
a reflector for reflecting light;
a backlight assembly between the reflector and the liquid crystal panel for irradiating light onto the liquid crystal display panel; and
an optical film between the backlight assembly and the liquid crystal panel, the optical film having:
a multi-layer sheet including:
a plurality of polymer layers, the polymer layers including polyethylene terephthalate and having a first refraction index in a first stretching direction parallel to a plane of the polymer layers and a second refraction index in a second stretching direction parallel to the plane of the polymer layers; and
a plurality of copolymer layers, the copolymer layers including polyethylene terephthalate copolymer and having a third refraction index in the first and second stretching directions,
wherein the third refraction index is equal to the second refraction index, and
wherein the polyethylene terephthalate polymer layers and the polyethylene terephthalate copolymer layers are alternatively stacked with each other a protection sheet on at least one side of the multi-layer sheet, wherein a thickness of the protection sheet is substantially equal to a thickness of the multi-layer sheet;
an acryl-based adhesive member between the multi-layer sheet and the protection sheet, the adhesive member comprising a refraction index smaller than a refraction index of the protection sheet; and
a diffusion member on the protection sheet,
wherein the diffusion member includes a transparent polymer layer on and directly contacting the protection sheet and a plurality of inorganic particles in the transparent polymer layer,
wherein the transparent polymer layer includes a plurality of protrusions corresponding to the inorganic particles,
wherein the protection sheet comprises the co-polymer material
wherein the thicknesses of the polymer layers gradually increase from the outer side to the center of the polymer layers,
wherein the thicknesses of the copolymer layers gradually increase from the outer side to the center of the copolymer layers, and
wherein the refractive index formed along the X-axis and a refractive index formed along the Y-axis are equal to each other in the protection sheet.

20. A method of fabricating an optical sheet, comprising:
preparing a polymer including polyethylene terephthalate;
preparing a copolymer including polyethylene terephthalate and an additive material;
melting and extrusion-processing each of the polymer and copolymer in layered shape;
alternately stacking the extrusion-processed polymer and copolymer;
multiplying the number of layers of the polymer and copolymer in a multiplier;
stretching the stacked polymer and copolymer in a first stretch direction;
stretching the first stretched polymer and copolymer in a second stretch direction, the polymer layers having first and second refraction indexes in the first and second stretching directions, respectively, and the copolymer layer having a third refraction index in the first and second stretching directions, the third refraction index being equal to the second refraction index;
attaching a protection sheet having a thickness being substantially equal to a thickness of the multilayer sheet on at least one side of the stacked polymer and copolymer with an acryl-based adhesive member, the adhesive member comprising a refraction index smaller than a refraction index of the protection sheet; and
forming a diffusion member on the protection sheet,
wherein the diffusion member includes a transparent polymer layer on and directly contacting the protection sheet and a plurality of inorganic particles in the transparent polymer layer,
wherein the transparent polymer layer includes a plurality of protrusions corresponding to the inorganic particles,
wherein the protection sheet comprises the co-polymer material
wherein the thicknesses of the polymer layers gradually increase from the outer side to the center of the polymer layers,
wherein the thicknesses of the copolymer layers gradually increase from the outer side to the center of the copolymer layers, and
wherein the refractive index formed along the X-axis and a refractive index formed along the Y-axis are equal to each other in the protection sheet.

* * * * *